July 29, 1958
R. E. ROEGER
2,844,879
GAGING MECHANISM
Filed Nov. 6, 1953
3 Sheets-Sheet 1
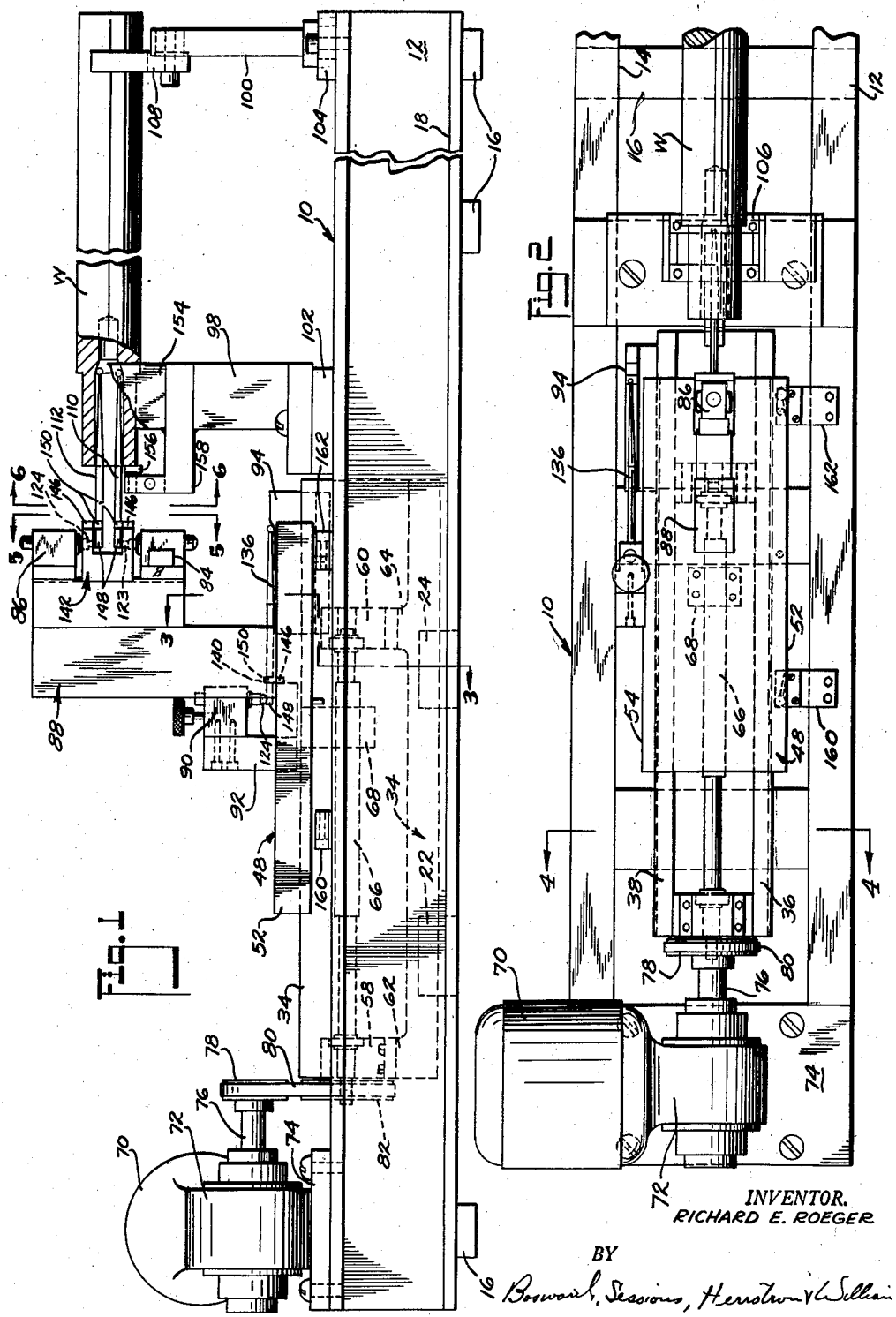
INVENTOR.
RICHARD E. ROEGER
BY
ATTORNEYS July 29, 1958 R. E. ROEGER 2,844,879
GAGING MECHANISM
Filed Nov. 6. 1953 3 Sheets-Sheet 2
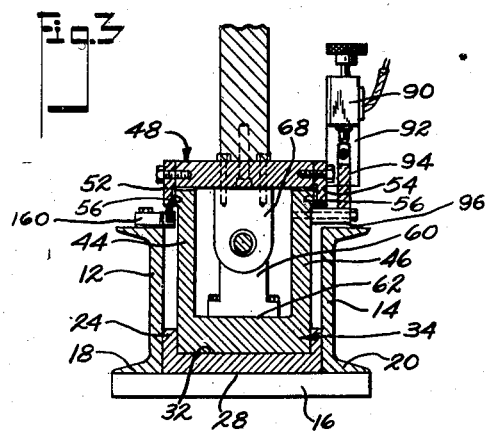
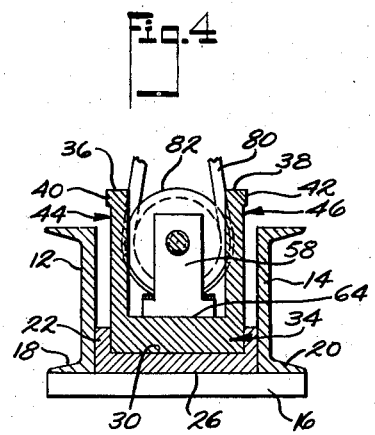
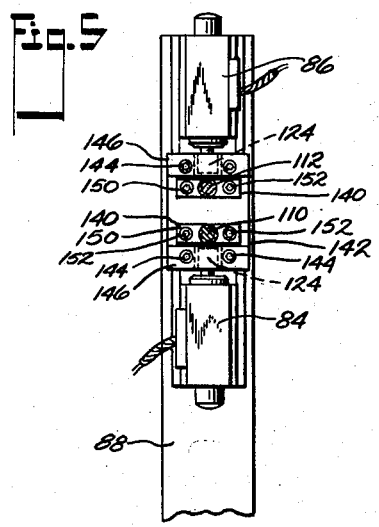
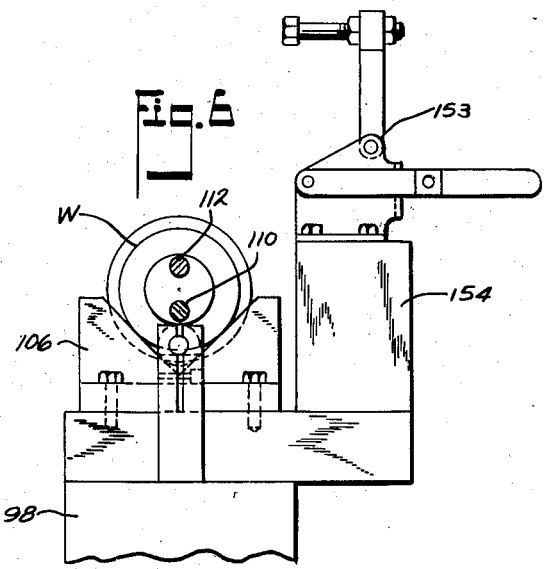
INVENTOR.
RICHARD E. ROEGER
BY
Bosworth, Sessions, Herrstrom & Williams
ATTORNEYS

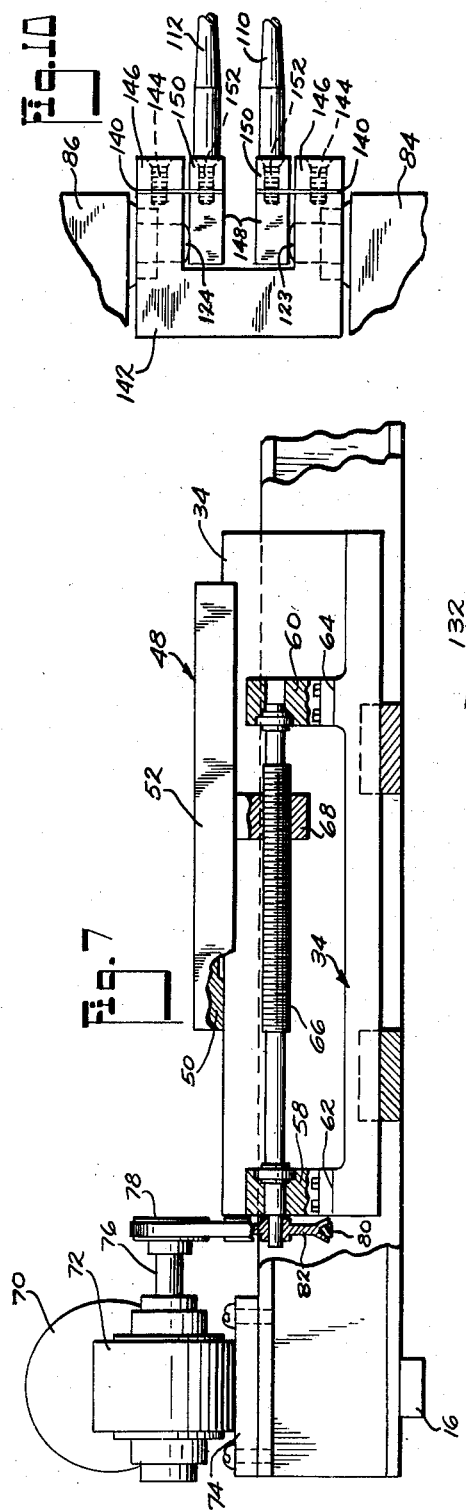

United States Patent Office 2,844,879
Patented July 29, 1958

2,844,879
GAGING MECHANISM

Richard E. Roeger, Maple Heights, Ohio, assignor to Cleveland Instrument Company, Cleveland, Ohio, a corporation of Ohio Application November 6, 1953, Serial No. 390,672

7 Claims. (Cl. 33—174)

This invention relates to measuring instruments and more particularly to improvements in gages, comparators and the like of the type employed to measure dynamically the contour surfaces of objects.

Heretofore, means for measuring contour surfaces accurately and quickly have not kept pace with means for static measurement of outside diameters of cylindrical objects. This is particularly true in situations where it is required to maintain several dimensions of a surface within precise tolerances not only as to each dimension, but also with respect to the relation of each dimension to every other dimension. For instance, it is often necessary to hold the taper of a workpiece within limits at various distances from a reference surface. This same situation develops in work where the surface is circular throughout but of varying diameter. In the case of interior surfaces, a special problem develops in that with standard I. D. gages, it is not possible to know whether it is a true diameter of a circular cross section or merely a chord which is being measured. Difficult problems also arise in attempting to determine whether diameters being measured, if correct, are also within lineal limits relative to a distant reference plane.

It is, therefore a general object of the invention to provide a gaging apparatus which will gage surfaces more accurately than heretofore possible. It is another object of the invention to provide a gage, comparator or the like of high sensitivity and yet so rugged and sturdy as to be applicable in high production shop use by unskilled operators. Another object of the invention is the provision of a gage which will quickly and precisely measure a circular surface along its true diameters. It is still another object of the invention to provide a gaging apparatus which will instantaneously record the deviation of a gaged surface from a specified standard on either a permanent tape or a visual dial, or both. A further object of the invention is the provision of a gaging apparatus which may be operated manually or may be entirely automatic in its operation. It is a further object of the invention to provide a gaging apparatus of the comparator variety in which the exploration of a master reference surface is synchronized with the exploration of the surface of a workpiece and the deviation between the two surfaces is automatically amplified, calibrated and recorded. A still further object of the invention is the provision of a gaging apparatus which will continuously gage workpieces along a surface as distinguished from spot checking at various places along such surface. It is still a further object of the invention to provide a simple effective means for automatically moving a workpiece and gage head relative to each other to perform the desired gaging operation. Other objects of the invention include the provision of a gaging apparatus which is simple and foolproof in operation, comparatively easy to maintain, and which is capable of making repeat measurements with a high degree of precision.

To the attainment of these ends and the accomplishment of other new and useful objects as will appear hereinafter, the invention consists in the features of novelty more fully described, claimed and shown in the accompanying drawings illustrating a preferred embodiment of this invention in which, Figure 1 is a front elevation of a preferred embodiment of the invention illustrating the general arrangement of the various parts relative to each other.

Figure 2 is a top plan view of the invention illustrated in Figure 1,

Figure 3 is a section taken substantially along the line 3—3 of Figure 1,

Figure 4 is a section taken on the line 4—4 of Figure 2,

Figure 5 is a section taken on the line 5—5 of Figure 1,

Figure 6 is a section taken on the line 6—6 of Figure 1 and showing an end view of the V-block workpiece support, Figure 7 is a fragmentary elevational view of the embodiment of the invention shown in Figure 1, wherein the apparatus drive means is more explicitly detailed, Figure 8 is a schematic diagram of the type of measuring head used in this invention, Figure 9 is a perspective view of the amplifier and moving tape recorder used to record signals set up by the measuring head of Figure 8, and Figure 10 is an enlarged fragmentary elevation of the probe carrying apparatus used in conjunction with the measuring heads.

Briefly, a preferred embodiment of the invention may be subdivided for analysis into three general groups or sub-assemblies, namely, (1) the base sub-assembly including slide ways, a master surface reference block, a prime mover and related driving mechanism; (2) the measuring head base plate sub-assembly adapted to slide on said ways and including measuring heads (also sometimes referred to by those skilled in the art as transducers or pickups) secured to said base plate, and probes secured to said measuring heads for sliding contact with stationary objects when said base plate is slid back and forth along the ways; (3) and the workpiece support sub-assembly secured to said base and adapted to align a workpiece with a measuring head.

The base plate is mechanically connected to a prime mover, such as an electric motor, so as to be moved back and forth on the ways along the longitudinal axis of the base. During forward movement, probes are simultaneously exploring a master reference surface and the corresponding surface of a workpiece, and deviations between the two are amplified, calibrated and recorded. When the limit of surface exploration has been reached, the base plate contacts and closes a limit switch which reverses the motor and returns the base plate rearwardly until a second limit switch is closed by contact with the base plate whereupon the motor is shut off and one gaging cycle has been completed. To start another automatic cycle, after another piece has been properly aligned in the support, the operator merely presses a starting button or equivalent starting device and the cycle is repeated.

*The base group*

Referring now to the drawings in greater detail, a base generally designated by the numeral 10 (Figure 1) comprises a pair of 5" channel members 12 and 14, shown in section in Figures 3 and 4, horizontally parallel and spaced apart. The channels are rigidly secured together by means of a series of transverse braces 16 fastened to the bottom surfaces of flanges 18 and 20 of channels 12 and 14 respectively, by welding or by use of conventional threaded fasteners (not shown). A pair of steel blocks 22 and 24 (Figures 3 and 4) extend transversely between the channels 12 and 14 with their bottom faces 26 and 28 flush with the bottom faces of flanges 18 and 20. Blocks 22 and 24 have grooves 30 and 32 machined therein to provide a solid base or support for U-shaped meehanite ways 34 having runners or ways 36 and 38 (Figure 4). These ways 36 and 38 and the side surfaces 40 and 42 of legs 44 and 46 are machined to a high finish in order to provide smooth and precisely accurate surfaces for a sliding base plate 48. A pair of pillow blocks 58 and 60 (Figure 7) are secured to pads 62 and 64 respectively of the ways 34 to journal a drive screw 66. A dog nut 68 is secured to the under surface of the base plate 48 and depends therefrom between pillow blocks 58 and 60 for threaded engagement with the drive screw 66. An electric motor 70 is drivingly connected to a reduction gear box 72 and the unit is anchored to a platform 74 secured transversely across one end of the base 10. A drive shaft 76 extends from the gear reduction box 72 in longitudinal alignment with the axis of the base and a pulley 78 secured to one end of the driveshaft is drivingly connected by belt means 80 to a drive screw pulley 82.

*The base plate group*

The base plate 48 is a rectangular steel plate having four accurately machined pads 50 (Figure 7) on the lower surface of the plate, one on each corner. These pads 50 are machined to a finished surface for sliding contact with the surface of the ways 36 and 38. Side plates 52 and 54 (Figure 3) are secured to the longitudinal edges of the base plate 48 and are provided with pads 56 for sliding contact with the finished surfaces 40 and 42 (Figure 4) of the legs 44 and 46 respectively.

A pair of vertically opposed workpiece pickups 84 and 86 are rigidly secured to a pickup support post 88 (Figures 1 and 9). Post 88 is rigidly fastened to base plate 48 and aligned on the longitudinal axis of the base. A reference surface pickup 90 (Figure 3) is likewise secured to a support post 92 which is fastened to side plate 54 of the base plate 48. A reference surface block 94 is fastened to leg 46 of the ways 34 by means of an L-shaped bracket 96.

While the mechanism of the gage heads 84, 86 and 90 may be of any suitable construction, the head preferably is constructed in accordance with Patent 2,627,119 issued February 3, 1953, in the name of Erwin W. Graham, and assigned to my present assignee. This construction (Figure 8) comprises an iron armature member 114 carried by spring members 115 and 116 so that it may move axially across the poles of an excitor coil 118 and a pair of pickup coils 120 and 122. The measuring tip 124 is carried by the armature member 114 and as the tip makes contact with the work, it shifts in position causing the iron armature to move across the pole pieces of the coils. With this arrangement, when the excitor coil 118 is excited from a suitable A. C. source, A. C. voltages will be induced in coils 120 and 122 and, upon change in position of armature 114, the output of one of the coils will be increased while the output of the other coil will be decreased. These coils are connected in series in such manner that the voltages induced in the two coils oppose each other, and the output of the opposed coils is connected to the amplifier. After amplification, the amount of displacement of the tip 124 is indicated on a meter dial 128 of the amplifier 126 unless a permanent record is desired, in which case a recorder 130 is also provided. The recorder may be of the pen and tape driven variety and of conventional construction; it is connected to the output of the amplifier 126 to drive the pen 132 across a tape 134 which is advanced by an electric motor (not shown). The recorder motor and the motor 70 which moves the probes 110 and 112 in contact with the workpiece W are connected together by suitable wiring so that the recorder motor is only energized while the probes are moving forwardly.

The master surface probe 136 is secured to its pickup 90 in the same manner that probes 110 and 112 are secured to pickups 84 and 86 respectively. Referring to Figures 5 and 10 and specifically probe 110, a leaf spring 140 is clamped to a C-shaped bracket 142 by means of screws 144 and a pressure block 146. The upper half of the leaf spring is clamped between a gaging tip contact block 148 and a pressure block 150 by means of screws 152. The probe 110 is carried in the pressure block 150 to project horizontally therefrom for sliding contact with the workpiece W, and the upper half of the C-shaped bracket 142 carries probe 112 by means of like parts similarly designated. The probe carrying pressure blocks 150 are spaced sufficiently apart from pressure blocks 146 to permit such flexing of leaf springs 140 as to permit each probe to be fulcrumed about said springs, whereby deflection of the probe tips will be translated into diminished movement of the contact blocks 148 against gaging tips 123, 124. The movement of each gaging head is amplified as aforesaid and correlated against the movement of the other gaging heads. Thus, for example, if a conical inner surface is to be gaged, the amounts each of the probe tips of probes 110 and 112 converge toward each other can be made cumulative on the amplifier. If the taper is true, corresponding movement of the tip of probe 136 will register one-half of this sum, but by calibrating this movement to record twice this amount, by balancing the movement of the reference surface probe 136 against the cumulative movement of the workpiece probes 110 and 112, the amplifier will read a constant value, indicating that the workpiece taper is true. If the sum of the movement of the probes 110 and 112 deviates from the calibrated movement of probe 136, this amount will be indicated on the amplifier in convenient units, such as thousandths of an inch, showing the deviation of the taper from standard. The indicated reading on the amplifier corresponding to the position of the probe in contact with the work will give the deviation from true size at that point.

From the foregoing, it will be evident to those skilled in the art that, if desired, the need for calibration of the movement of the tip of probe 136 may be eliminated by adding another pickup in vertical opposed alignment with pickup 90 to carry a probe extending therefrom in substantial alignment with probe 136. This in effect would duplicate the arrangement of pickups 84 and 86 whereby the induced voltages of the workpiece pickups would be compared directly with the induced voltages of the master surface pickups without need for calibration or amplification of the latter voltages. With this modification, of course, the master reference surface block 94 would have the same type of surface or surfaces to be explored as encountered on the workpieces. Where it is necessary to gage three or more surfaces for alignment relative to each other, as well as to gage their separate surfaces for correct contour, the required number of additional pickups may also be mounted on support post 88 and the reference surface pickup 90 will be correspondingly calibrated. In some cases it will be better to have multiple reference surface pickups corresponding to respective workpiece pickups for contact with a multiple surface reference block.

It is also within the contemplation of the invention that in certain applications of the apparatus it may be advantageous for measuring head contact to be made directly with the workpiece and reference surfaces such as by means of their respective gaging tips, whereupon, the said probes and probe mounting means may be dispensed with.

The terms "pickup," "transducer," and "measuring head" are used interchangeably within the meaning and scope of the invention and are defined as a means of measuring a surface of an object including but not limited to specific surface contacting means.

The work support group

The workpiece support comprises a pair of posts 98 and 100 adjustably secured to plates 102 and 104 respectively which are in turn rigidly fastened to the upper flanges of channels 12 and 14, and a pair of V blocks 106 and 108 adjustably fastened to posts 98 and 100 respectively. The vertices of V blocks 106 and 108 are accurately aligned on the longitudinal axis of the base 10 so that a workpiece W supported in the V blocks is in position to have its surface or surfaces explored by a pair of horizontally extending probes 110 and 112 secured to pickups 84 and 86 respectively.

When the workpiece W is sufficiently heavy, no holding means is required in conjunction with the V blocks 106 and 108. However, for light work and for clamping a master workpiece in place when accurate adjustment relative to the surface of the reference blocks 94 is to be made, a toggle clamp 153 (Figure 6) is provided and is attached to post 98 by means of a bracket 154. A reference surface contact button 156 is also attached to post 98 by means of a bracket 158 for locating a finished surface of the workpiece W to align the workpiece longitudinally.

Operation

To set up the machine for operation, an accurately machined master workpiece (not shown), conforming as nearly as possible to the shape of the master reference surface 94, is secured by toggle clamp 153 (Figure 6) in the workpiece support 98 and aligned with the vertically opposed pickups 84 and 86. The apparatus is then placed in operation and if the surfaces of the master workpiece are accurately aligned and are a true replica of the shape of the reference surface 94, then, for instance, movement of the workpiece probes 110 and 112, as they are turned inwardly along a converging taper, will cancel out the movement of the reference surface probe 136 as explained hereinabove, and the amplifier dial will remain at zero. This zero reading of the amplifier indicates that the apparatus is in adjustment and ready to gage the surfaces of production workpieces.

The toggle clamp is then released, the master workpiece is removed and a production workpiece W is placed in the V blocks 106 and 108 with a finished surface in contact with contact button 156. A starting switch is then thrown causing electric motor 70, by pulley and belt means, to rotate drive screw 66 which in turn slides the base plate 48 forwardly. With this forward movement, probes 110 and 112 engage and explore the surface of the workpiece W and when the end of the surface has been reached, the base plate 48 makes contact with a limit switch 162 secured to the upper flange of channel 12, closing the switch and reversing the motor. This reverses the rotation of drive screw 66 and backs probes 110 and 112 out of the workpiece. When the probes are free and clear, base plate 48 makes contact with and closes limit switch 160, also secured to the upper flange of channel 12. Whereupon limit switch 160 shuts off the motor 70 and the measuring cycle has been completed, the entire cycle requiring but a few seconds from start to finish.

From the foregoing, it may be seen that this apparatus provides an accurate and extremely practical gaging device for checking surfaces of workpieces having varying contours and shapes normally extremely difficult if not impossible to gage by standard means. The apparatus is precise enough for laboratory use and yet is rugged and simple enough for production line inspection by unskilled personnel.

While only one embodiment of the invention is shown and described, it is understood that this embodiment is by way of example only and is not to be construed in a limiting sense. Other arrangements and modifications will occur to those skilled in the art and may be made without departing from the scope of the invention.

I claim:

1. A gaging device for measuring the true diameters of circular surfaces of an object by simultaneously exploring the surfaces on opposite ends of the diameters and comparing deviations of these surfaces from that of a master reference surface, said device comprising a base, flat co-planar ways secured to said base, a base plate secured to and adapted to slide on said ways, a first measuring head post rigidly secured to said base plate, a pair of opposed, vertically aligned measuring heads secured to said post and having mutually opposed gaging tips projecting therefrom, a pair of spaced, horizontally projecting probes each fulcrumed to one of said measuring heads, a second measuring head post rigidly secured to said base plate, a master measuring head secured to said second post and having a gaging tip projecting downwardly therefrom, a master probe fulcrumed to said master measuring head and horizontally projecting therefrom, a master reference block secured to said base for contact with said master probe, an object locating support secured to said base and adapted to locate the interior surface of an object with respect to said mutually opposed gaging tips, means for moving said base plate along said ways whereby said pair of probes engage and explore on the true diameters of the said surface of an object aligned in said support, and said master probe simultaneously engages and explores longitudinally along the reference surface of the said master reference block, and means for algebraically adding the radial displacement of the pair of probes and comparing this sum to twice the displacement of the master probe normal to the surface of the master reference block, whereby the difference between the algebraic sum of the radial displacement of the pair of probes and twice the displacement of the master probe normal to the surface of the master reference block represents the amount of deviation of the workpiece from standard.

2. The device set forth in claim 1 wherein said means for comparing the contour of the surface of an object to said master reference surface comprises a recorder, means for connecting said measuring heads to said recorder and means for registering on said recorder the difference between twice the movement of said master measuring head gaging tip and the summation of movement of said mutually opposed gaging tips.

3. The device set forth in claim 1, wherein said means for comparing the contour of the surface of an object to said master reference surface comprises an electric amplifier having a needle and dial face, means for translating mechanical movement of said gaging tips into electrical signals in said amplifier, including means for translating said electrical signals into a calibrated dial reading reflecting the difference between twice the movement of said master measuring head gaging tip and the summation of movement of said mutually opposed gaging tips.

4. The device set forth in claim 1, wherein said means for comparing the difference in contour between said workpiece surface and said master reference surface comprises a driven pen and tape recorder means for recording on said tape in a continuous line the difference between twice the movement of said master measuring head gaging tip and the summation of movement of said mutually opposed gaging tips.

5. The device set forth in claim 1 wherein said means for gaging said workpiece surface is automatic and comprises a screw longitudinally aligned beneath said base plate and journaled on opposite ends in pillow blocks secured to said base, a nut rigidly fastened to the under side of said base plate for threaded engagement with said screw, an electric motor drivingly connected to said screw, a motor reversing limit switch secured to said base for actuation by said base plate to reverse said motor when said probes have reached the end of their forward movement, and a motor cut-off limit switch secured to said base for actuation by said base plate when said base plate has been returned by said screw to the end of its rearward stroke.

6. Apparatus for gaging the interior annular surface of a workpiece bore comprising a pair of measuring heads including a respective pair of gaging contacts adapted to project into said workpiece and engage opposite sides of said annular surface, a workpiece locating support adapted to locate and hold the workpiece with respect to said contacts, means for moving said contacts and workpiece relative to each other to cause said contacts to traverse said surface along lines lying in a plane passing through the axis of said bore, a third measuring head having a gaging contact, a master reference block having one surface shaped to provide a profile matching the ideal shape of one of said lines lying in the plane passing through the bore axis, and means for moving said third contact and said master reference block relative to each other in synchronized relation to the motion of said pair of contacts and said workpiece relative to each other means to algebraically add the radial displacement of the surface contacting ends of said pair of probes and to compare this sum to twice the displacement of the said third probe with respect to said master reference surface.

7. The apparatus set forth in claim 6, wherein said pair of gaging contacts each include a gaging tip projecting from a respective measuring head, a slender elongated probe carried by each measuring head and positioned for contact with said interior annular surface on one end and with a gaging tip on the opposite end, said surface contacting ends of said probes being adapted to engage opposite sides of said annular surface on a line normal to and intersecting the axis of said bore.

References Cited in the file of this patent

UNITED STATES PATENTS

| | | |
|---|---|---|
| 968,884 | Reisner | Aug. 30, 1910 |
| 1,390,432 | Douglass | Sept. 13, 1921 |
| 1,928,373 | Flatter | Sept. 26, 1933 |
| 2,407,490 | Gregg | Sept. 10, 1946 |
| 2,419,461 | Neff | Apr. 22, 1947 |
| 2,457,727 | Rifenbergh | Dec. 28, 1948 |
| 2,600,550 | Levesque | June 17, 1952 |
| 2,623,293 | Nebesar | Dec. 30, 1952 |
| 2,627,119 | Graham | Feb. 3, 1953 |
| 2,633,020 | Abbott | Mar. 21, 1953 |
| 2,632,956 | Crosby | Mar. 31, 1953 |
| 2,640,272 | Bear | June 2, 1953 |
| 2,648,912 | Osgood | Aug. 18, 1953 |
| 2,657,469 | Brown | Nov. 3, 1953 |
| 2,675,621 | Mims | Apr. 20, 1954 |

FOREIGN PATENTS

| | | |
|---|---|---|
| 314,502 | Germany | Sept. 23, 1919 |
| 549,737 | Great Britain | Dec. 4, 1942 |